United States Patent [19]
Clarkson et al.

[11] Patent Number: 5,235,433
[45] Date of Patent: Aug. 10, 1993

[54] SYSTEM AND METHOD FOR AUTOMATICALLY INDEXING FACSIMILE TRANSMISSIONS RECEIVED IN A COMPUTERIZED IMAGE MANAGEMENT SYSTEM

[75] Inventors: Charles J. Clarkson; John E. St. Lawrence, Jr., both of Austin, Tex.

[73] Assignee: International Business Machines Corporation, Armonk, N.Y.

[21] Appl. No.: 693,520

[22] Filed: Apr. 30, 1991

[51] Int. Cl.⁵ .............................................. H04N 1/32
[52] U.S. Cl. .................................... 358/434; 358/400
[58] Field of Search ............... 358/400, 404, 405, 434, 358/435, 439, 440; 395/161, 155

[56] References Cited

U.S. PATENT DOCUMENTS

| | | |
|---|---|---|
| Re. 31,182 | 3/1983 | Crager et al. |
| 4,058,838 | 11/1977 | Crager et al. |
| 4,249,216 | 2/1981 | Kanda |
| 4,419,697 | 12/1983 | Wada |
| 4,432,020 | 2/1984 | Onose et al. ........................ 358/434 |
| 4,606,069 | 8/1986 | Johnsen |
| 4,811,111 | 3/1989 | Kurokawa |
| 4,849,816 | 7/1989 | Yoshida ............................. 358/434 |
| 4,922,348 | 5/1990 | Gillon et al. |
| 4,960,981 | 10/1990 | Benton et al. |
| 4,996,707 | 2/1991 | O'Malley et al. |
| 4,999,790 | 3/1991 | Murayama et al. |
| 5,068,888 | 11/1991 | Scherk et al. |

FOREIGN PATENT DOCUMENTS

2208989A 4/1989 United Kingdom.

Primary Examiner—Edward L. Coles, Sr.
Assistant Examiner—Kim Yen Vu
Attorney, Agent, or Firm—Robert M. Carwell

[57] ABSTRACT

A system and method is provided for automatically indexing facsimile transmissions into an image management system by applying telephony data accompanying the fax transmission to index the transmission by use of a substitution table. In correlating telephony data functionally related to the sender identification to the image without having to read such data from the image itself by means of optical character recognition or the like, image data is first transmitted in facsimile form to an image management system where it is received and stored. Simultaneously, telephony data is received by the system associated with the image transmission. The system then processes the telephony data to detect the identity of the sender by means of a lookup table correlating the telephony number to the sender, whereupon the received image data is thereby associated with the detected sender identification. In a particular embodiment, the telephony data will further include data functionally related to enabling detection of length of call, day, date, and/or length of transmission, such supplemental parameters being employed in the indexing process for routing of the received image.

24 Claims, 4 Drawing Sheets

PRIOR ART

SYSTEM AND METHOD FOR AUTOMATICALLY INDEXING FACSIMILE TRANSMISSIONS RECEIVED IN A COMPUTERIZED IMAGE MANAGEMENT SYSTEM

FIELD OF THE INVENTION

This invention relates to image management systems, and, more particularly, relates to systems and methods for indexing facsimile transmissions of such image data.

BACKGROUND OF THE INVENTION

Due to the increasing complexity and volume of image data which must be processed in the transactions of modern day business entities numerous computerized techniques were developed in the art for managing the receipt, flow, and indexing of such images. One such technique comprises the scanning of paper into an image-processing system by means of an optical character recognition (OCR) or bar code reader device or the like, wherein the image has attached thereto a set of one or more indexes serving to differentiate it from the other images. These indexes may relate to the dates, originator, receiver, line of business, i.e. whatever is required by the end user in order to properly use the image.

In less sophisticated systems, when the image originates on paper, at least the data is readily available to the person scanning it and may be entered manually to the image storage server as desired. In more sophisticated systems, of course, this indexing information may be scanned automatically for subsequent use, for example, in routing the image to predetermined areas in the business enterprise which require it.

Such systems suffer from numerous drawbacks. First, the state of the art in OCR is such that it is still not reliable as required for many applications, the equipment for performing the scanning is expensive, and often the scanning process is far too slow to obtain the image throughput and reliability required. Moreover such systems presuppose that the necessary information for indexing will have previously been properly placed into the image by the supplier prior to its transmission. Additional problems associated with manual entry or scanning of the necessary index information relate obviously to the problems and expense, particularly with large volume systems, associated with wasted machine cycles, a necessity for an operator to manually call up an image and keyboard the indexing data, and the further drawback or difficulty of assigning priorities to various images wherein, for example, a human operator must make manual on the spot determinations regarding the order in which images are processed, where they are routed, and the like.

In the art of facsimile transmissions, historically similar and even more difficult problems have been encountered in reliably indexing the faxed images. In such systems the image typically is received into an image system without human intervention, in which case human keyboarding of the indexing data is impossible, or may be done only by viewing the image after its reception and storage, leading to the associated problems of expense, lack of reliability in speed, automated routing, and the like associated with such human intervention. Thus, systems had to be sized sufficiently large to accommodate the extra manual indexing effort required to store these receptions of image data, retrieve them, and present them for manual indexing.

Yet another problem also present in the conventional systems for fax transmission in attempting to index such vast volumes of data was similar to that of the scanning technology for automatic indexing, namely that reliance had to be placed or often misplaced on the transmitter of the image or fax to include the necessary information in the image or the fax data itself in order to facilitate the proper indexing upon receipt of the data.

As previously noted, when the frequency of fax receptions is only casual as compared to the main bulk of the enterprise's load on its image system, there was generally less of a problem associated with accomplishing this indexing step manually it being simply a matter of scheduling a human operator to do the viewing and keyboarding.

However, with the increased pace of modern business transactions, the urgency of a fax transmission requiring immediate attention by the enterprise is on the increase as is the sheer volume of such fax transmissions. Accordingly, it would be extremely useful to provide for an automatic fax indexing method to overcome the cost, potential delays, and the like engendered by human indexing, as well as to provide for the automatic routing of the image data and customized handling as a function of its urgency, etc.

Due to the aforesaid problems, there were attempt with respect to facsimile transmission to provide indexing data to a personal computer attached to the fax machine. Specifically, there is provision for optional data which a sending fax transmission may include with its image referred to in the art as terminal self identification (TSI). such capability being provided in machines adhering to the Group III CCITT Standard, such standard being internationally promulgated in order to facilitate coordination of consistent fax machine capability.

In accordance with such technology, although the TSI data may be included with the fax transmission in order to facilitate indexing of the image, including correlation of the received image with the sender, the receiver of the fax was nevertheless still at the mercy of the sender in having to rely on the sender including accurate TSI data. Moreover, many applications could not justify the expense of employing only facsimile equipment which was compliant with the Group III Standard.

For the foregoing reasons, a system and method was needed which could provide for the orderly flow of facsimile images through a business including indexing of the images, which was inexpensive, reliable, did not require any special act or equipment on the part of the sender in order to facilitate such imaging, automatic in order to obviate the obvious throughput and expense problems associated with human indexing, and which further provided the capability for sophisticated automatic handling of the image such as customized routing without having to decode the information from the image in the fax itself. These and other benefits are provided by the present invention which may be better understood with reference to the accompanying drawings wherein:

DETAILED DESCRIPTION

Figure 1:
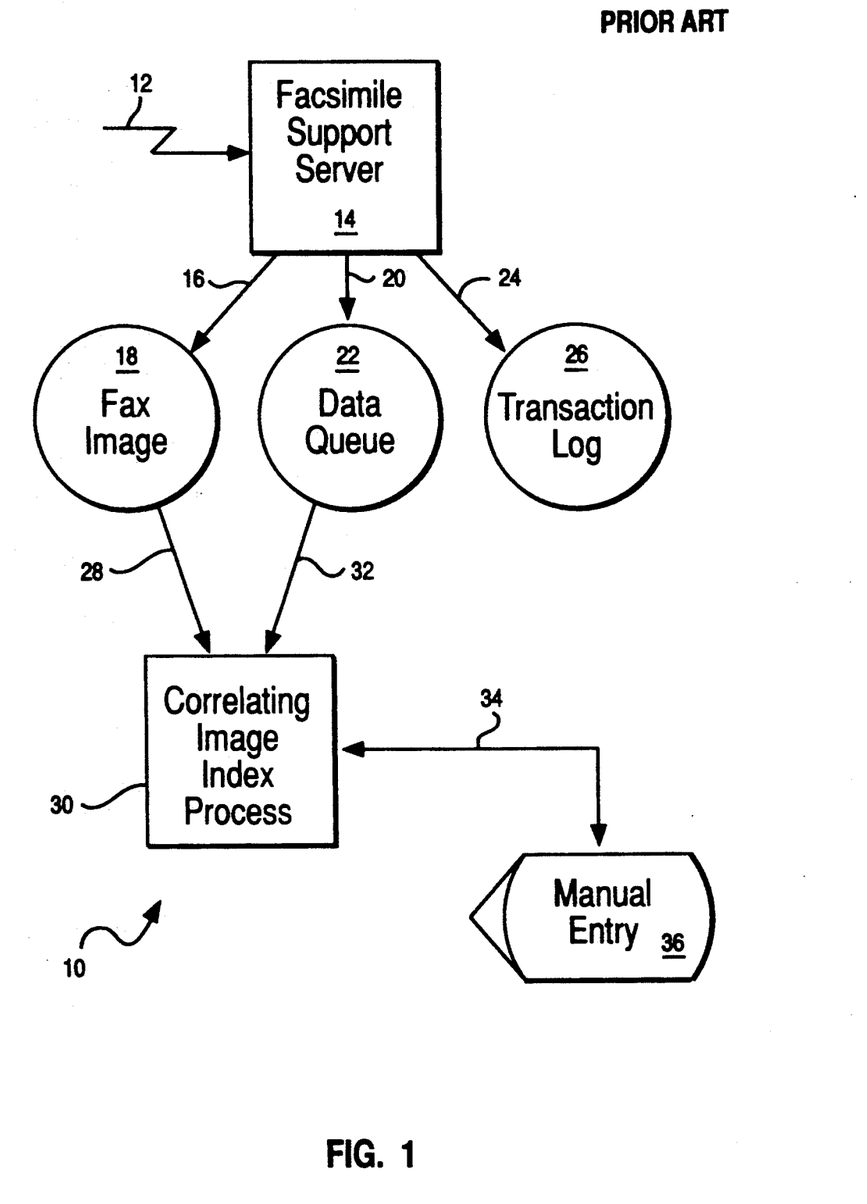
FIG. 1 is a schematic block diagram of a typical facsimile management and imaging system of the prior art.

A general description of the problem being addressed by the present invention will first be addressed with reference to FIG. 1. In a conventional facsimile transmission system, telephony data is sent in a facsimile format and protocol as fax transmission 12 which is received and then subsequently processed by the facsimile management system 10. Such a system is conventionally provided with some form of facsimile support server 14 computer program which is essentially a facsimile "catching" software program, the purpose of which is to facilitate the storing of the fax image and associated data as well as to generate a log of events occurring subsequent to the initial program load. The server 14 is a program implemented in software for effecting the fax receiving process wherein after the image data is received over an appropriate transmission line, the fax image is delivered as shown functionally by line 16 to a fax image file 18. With respect to each such image, the server 14 further generates and stores a record, as shown functionally by line 20, into a data queue file 22. This file includes information from the fax transmission 12 necessary to identify where the system 10 placed the image data in its respective file 18.

The reason for this is that at a later time the image indexing process component of the fax management system 10 will then be invoked typically by a human operator, in order to see, for example, if there are any images awaiting processing whereupon this information must be read off the data queue 22. As a specific example of the operation of prior art systems, a fax order may have been received by a business entity requesting movement of the business s box car by a railway company having such a fax management system implemented. The railway employee would look at the fax order entry form or, in the alternative, query the information in the data queue 22, and learn that a fax image relating to the order was previously received and stored for example as an image file having a specific file identification, represented by reference numeral 18, whereupon the employee will process the order in an appropriate manner, return to query the data queue 22 for yet another order, and continue in this manner.

Still referring to FIG. 1, the data stored in the data queue record, in accordance with conventional practice, is typically redundantly posted, as shown functionally by arrow 24, into a transaction log 26. Once the image and associated data is processed, the record from the data queue 22 is deleted. Accordingly, the purpose of the transaction log 26 is to serve as an audit trail for each record processed in the data queue 22, such activity being posted in the transaction log 26. In accordance with prior systems, when the human operator has thus noted the information associated with the data queue 22 either on the physical copy of the fax image or by querying the data queue record 22, by manual entry 36 in a keyboard or the like, the operator will provide information input, functionally shown as arrow 34 into the image indexing process 30. This will typically be a computer-controlled indexing process wherein, in response to such manual entry 36, the indexing process 30 will effect and store a computerized correlation between a given fax image file 18 and the correlative data of the data queue 22 associated therewith. This is shown schematically by the arrows 28 and 32 delivering their correlative image and data queue data into the correlating indexing process 30. In this manner, subsequent querying of the fax management system 10 will yield identification of a particular fax image uniquely associated with the data of the query such as the customer identity time or routing of the order placed by facsimile transmission or the like as desired.

The numerous drawbacks of the system thus described will be readily recalled, including the reliance upon the transmitter of the facsimile to include the necessary data correlating the fax image to the sender, the expense associated with facsimile machines which will transmit sender identity automatically via TSI, the expense and lack of reliability of human operators in performing the indexing function, and the like. Accordingly, with reference now to FIG. 2, the automatic facsimile indexing system 102 of the present invention will be described in greater detail.

Figure 2:
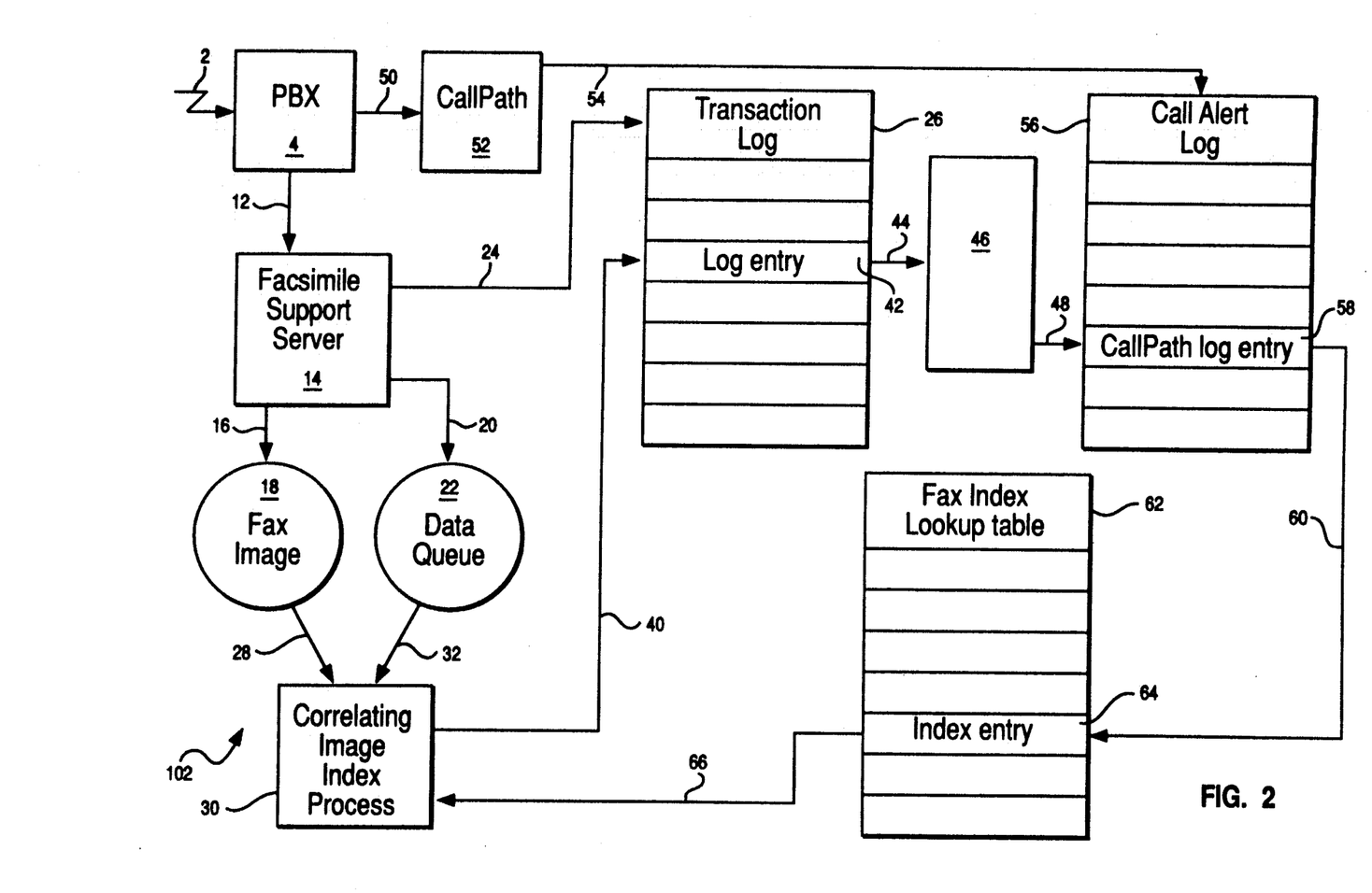
FIG. 2 is a functional block diagram of the facsimile management and indexing system of the present invention.

A telephone monitoring software module 52, in response to the telephony signal 50 from the PBX 40, as a result of an incoming fax transmission, will generate a record of the telephone number from which the fax was sent as well as the date and time the call was answered by the PBX 4. The facsimile server 14 constructs the previously described transaction log 26 whereby it will contain similar information relating to when the particular facsimile transaction was completed. Each log entry 42 in the transaction log 26 will thus contain, as previously noted, all of the information in the data queue file 22 along with the particular call's duration, date, and time the call was completed, as well as supplemental information such as the particular fax card in the server 14 which handled the call. In conventional systems, this information in the transaction log 26 is used, for example, normally as a printout to see, for a given fax card, the amount of traffic handled through the card, how long the calls have lasted, etc.

When the fax server 14 answers a call, the telephone monitoring module 52, as previously described, generates a call alert record 58 in a call alert log 56 comprised of the telephone numbers of both the facsimile machine originating and receiving the fax transmission, this data being shown as being transferred into the call alert log 56 from the telephone monitoring module 52 by way of the arrow 54. When the facsimile image is received by the imaging system 102, the system will process the data queue and bring in the image stored as the fax image file 18 to be handled in a manner to be described. The problem being addressed by the present invention is essentially one of correlating the image data with its origin as represented by the telephone number of the originating fax transmission or, stated differently, the correlating of the information on the transaction log 26 with the information on the call alert log 56. It will be recalled that the transaction log 26 will contain, as a subset, information which was derived from the data queue 22 so that the process may find a match in the transaction log. Specifically, each log entry 42 corresponds to a particular image. Moreover, in the transaction log 26 for each such log entry 42 there is a time for the call corresponding to the time and date the image was stored and an indication of how long the call took. In the call alert log 56, corresponding to each such image there is an aforementioned call alert record 58 indicating the time the call was taken. Therefore subtracting the time the call took for the fax transmission from the time the call was completed will yield an approximate time when the call was first received. The module 46 represents this step in correlating the time in the log entry 42 of the transaction log 26 (shown as being provided to the module 46 by reference numeral 44) with the time indicated in the corresponding telephone monitoring software module log entry 58, such information similarly being shown as provided to the module 46 by reference 48. It will be recalled that the goal is to automatically identify the telephone number employed by the fax machine in the transmission of the fax image from the call alert log 56 and to associate this with a respective fax image.

It will be appreciated that in accordance with this correlating step of the module 46, an exact time of a received call will not always match with the process of subtracting the elapsed time of a call from the time of storage of the fax image. This will be due, for example, to the fact that the computer, in writing a transaction log 26, will do so at some finite point after the call is completed, and thus this discrepancy is a function of how busy the computer is at a particular time in performing other tasks before logging the completion, and the like. It is significant to note that in accordance with the teachings of the invention, the degree to which the logged time for the call origination in the transaction log 26 matches the calculated origination time (i.e. call completion time—transaction time in the call alert log 56) may preferably be a variable which can be changed to tune and optimize the search process. In other words, for example, the variable may be set such that if a matching of the logged and calculated origination times is within 25 milliseconds, seconds, this will be deemed a match and, if no such match is found, the discrepancy reflected by this variable may be increased, for example, to a one second disparity being nevertheless deemed a match. In other words, a changeable or configurable variable is thereby provided which essentially is saying that in order for a matching between the call times to be deemed a bona fide match, the logged and calculated times must be within a prescribed magnitude of difference.

Once a match is made between a telephone monitoring software module entry 58 and a transaction log 42 (i.e. corresponding entries are found in the transaction log 26 and call alert log 56 each corresponding to the same call with a particular origination time, this thereby provides a particular record 58 in the call alert log 56 and telephone number of the originating fax transmission which may thereby be used as an index into a fax index lookup table 62. As shown by reference numeral 60, the data in the telephone monitoring software module log entry 58 is utilized as an index into the lookup table 62 to select a particular index entry 64 which will correspond to a particular customer number associated with the originating telephone number of the fax transmission reflected in the log entry 58. This customer number thereby found in the index entry 64 may then subsequently be communicated, as shown by line 66, to the image indexing process 30 and employed to index or route the particular image of a document to a user as desired for further processing. i.e. the system 102 now has something to index or route the image with based upon the index entry 64 from the lookup table 62. The entry may include additional information about the sender pertinent to how the fax is to be subsequently processed as a function of the size or time of receipt of the image or the like. The image index process 30 accordingly brings the index entry 64 back into the image management process automatically in lieu of the manual steps 36 described in FIG. 1.

As part of the process of identifying the customer from the telephone number from which the fax transmission originated, it will be appreciated that it is conventional within the ISDN telephone service to provide Automatic Number Identification (ANI). This ANI is received along with the fax image data at the PBX 4 in the telephony transmission and is transmitted through the callpath module 52, as represented by line 54, so as to be placed in the corresponding log entry 58 of the call alert log 56. Thus, the function of the lookup table 62 in part is to correlate this ANI with a corresponding entry 64 in the lookup table 62 which corresponds to the identify of the customer originating the fax transmission.

From the foregoing, it will be appreciated that the system 102 of FIG. 2 thus achieves the hereinbefore described benefits over prior attempts to manage facsimile data. For example, the system has thus obviated the need to transmit identifying or indexing information along with the fax image itself, such as in the previously described Group III transmission protocol. This latter approach suffers from requiring sufficiently sophisticated sending equipment in addition to the serious drawback of requiring the customer to create and enforce a procedure instructing employees to set up the originating equipment to include the proper identifying information so that the indexing information could be obtained from the image itself or the data transmitted in the fax transmission. This TSI information, if sent, would of course nevertheless be present in the data queue file 22 so that redundantly the system 102 could in fact seek to index on this identifying information in the data queue as well.

Figure 3:
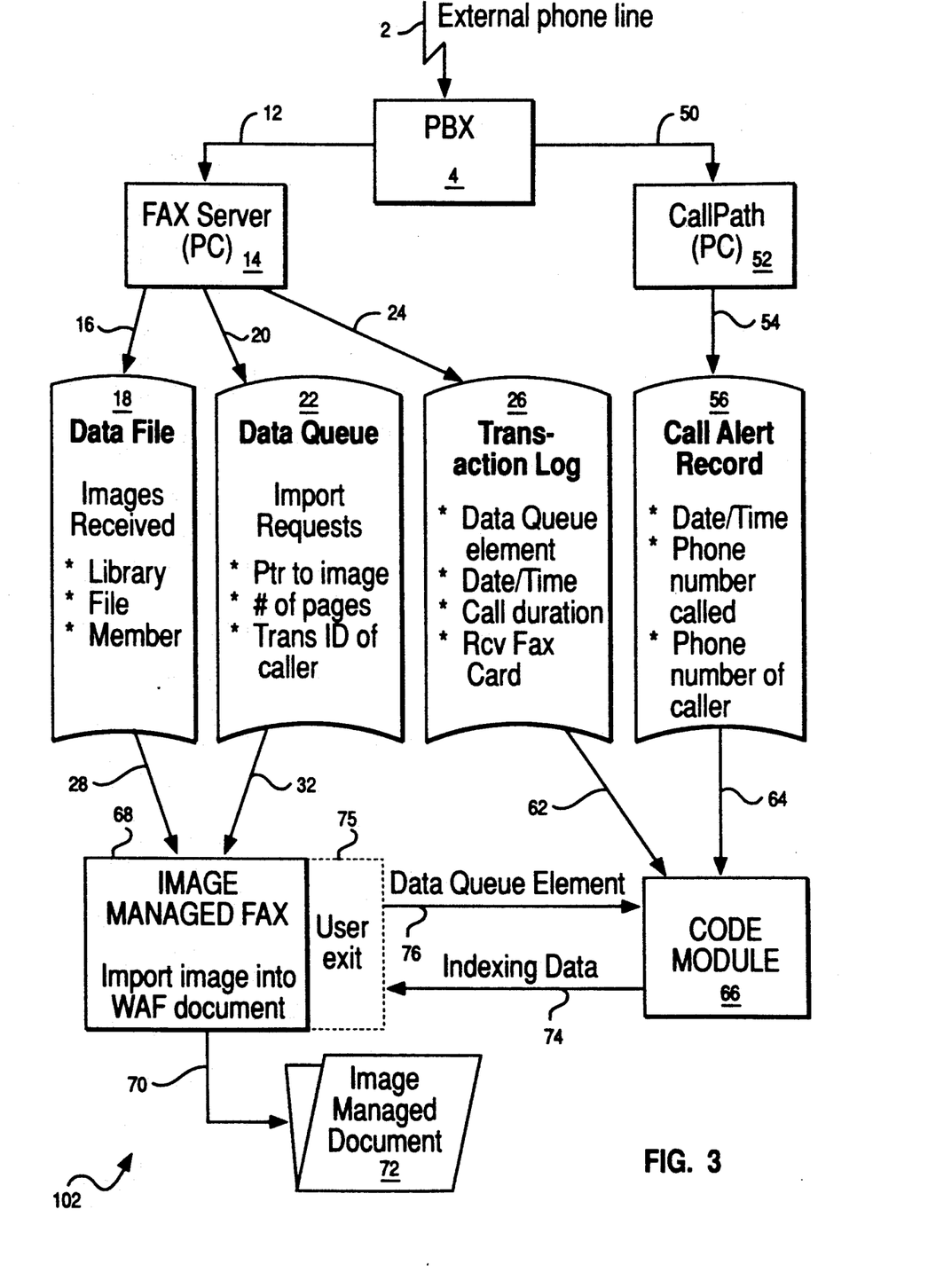
FIG. 3 is a functional block diagram depicting in greater detail components of the system of FIG. 2.

Referring now to FIG. 3, a more detailed description of functions and file content described with reference to FIG. 2 will now be provided. First, with respect to the fax image or data file 18, wherein the data forming the images received is stored as indicated in block 18, the record for each image received will include a data hierarchy indicating the logical path the operating system uses to access the image data stored on DASD. such as a library, file, and file member designation.

With respect to the data queue file, block 22, as previously described this represents the data necessary to issue a data image import request in order to bring a particular image in off of the DASD or other memory device into the image management system 102. As indicated in block 22, each data queue record corresponding to an image will preferably include the number of pages associated with the image and, if available, the transaction ID identifying a caller. This will be recognized as the terminal self identifier (TSI) number which is transmitted with some more full function facsimile machines. Additionally, each data queue record will include a pointer to it's corresponding image including, for example, the aforementioned library, file, and member information of the data file 18.

With respect to the transaction log 26, in like manner each record will also include a pointer into a corresponding image of the data file 18 in the form of a data queue element. The log entry will additionally include data indicating the particular call's duration, date, time the call terminated, and preferably the indicator of the particular fax card receiving the call. Finally with respect to the particulars of a record in the call alert record 56, a given record will preferably include in addition to the date and time the call was received, the phone number of the fax machine called, and the phone number of the fax machine from which the fax transmission was received. This latter phone number, it will be recalled, is derived from the novel technique of the subject invention previously described wherein a match is made between the logs 26 and 56 based upon the times in each log with a programatically-set window of overlap. It will be recalled that when two transactions are matched, the automatic number identification (ANI) is passed to the fax server and attached to the image, whereupon a pre-built table with information related to the ANI can fill in the indexing data necessary to process the image for further management purposes.

Still referring to FIG. 3, an image management fax module 68 is shown providing the front end interface facilitating the importing of image data, 28, and a corresponding data queue element, 32, into an image-managed document 72 as shown by arrow 70. The document 72 is intended to schematically indicate creation of a document having all data elements present for enabling an image management system to carry out all of the numerous functions provided by such a system intended to manage scanned and faxed data. Such functions will include management of work flow, security functions, storage, for example, of data on optical platters, and the like. Accordingly, it will be appreciated that the document 72 will include information in addition to that of the WAF fax import shown as arrow 70.

The fax module 68 will preferably further include provision for a convenient user exit 75 which will invoke function provided by the code module 66 to provide the features of the invention if present and, if not, to provide a convenient means to permit operation of the other functions of an image management system. The code module 66 will receive data from the transaction log 26 and call alert log 56, as shown by arrows 62 and 64, respectively, and will further receive by the user exit 75 the data associated with the data queue element for a particular image, as shown by reference numeral 76. It will be recalled that this data queue element passing on line 76 is essentially a pointer to a particular image. The purpose of the code 66 is to integrate this data queue element data with the phone number of the originating fax transmission (derived in accordance with the technique previously described) as well as the other information passed on lines 62 and 64 from the transaction and call alert logs 26 and 56 respectively, in order to generate indexing information passed on line 74 as a return to the user exit 75. This indexing information is essentially all the desired information relating to the origination of the fax transmission which may be generated from the appropriate lookup table given the pointer to the image and the identity of the caller. Such information may include the vendor number or other identity of the caller, and any other facts as desired regarding the facsimile originator important to a business using the image management system 102 or processing the image derived from the lookup process. For example, it will be noted that the number of pages of the transmission is one element of the data queue (see data queue file 22) passed to the code module 66 via link 32 and 76 through the user exit 75. Additionally, the code 66 has information passed to it via links 62 and 64 relating to the date and time of the fax connection, all of which may be employed by the code 66 to generate indexing information as desired which is returned on link 74 through the user exit 75 to the WAF fax 68.

Various combinations of the identity of the fax transmission originator, date, time, and length of transmission, and the like may be beneficially employed in the management of the faxed image in accordance with the invention. For example, a customer employing the system 102 may characteristically transmit bills of lading in the morning and invoices in the evening. By detecting time of transmission, the code 66 may generate the necessary indexing information indicating the type of image as a function of the time received. Similarly characterization of the transmitted image as a bill of lading or invoice may be functionally related to the number of pages of the transmission available in the data queue element or the image may be identified or characterized as a function of the time required for the transmission which the code 66 may derive from the transaction and call alert logs 26 and 56. Thus it may be appreciated that these parameters relating to time of transmission, number of pages, and the like in addition to the telephone number and thus the identity of the originator of the fax transmitter may be used to good effect by the code 66 in generating the correlative indexing and/or routing of images, such indexing information being passed as shown by link 74 to the WAF fax module 68.

It will be recalled that in one implementation of the invention it is recognized that there will not always be a one-to-one correspondence between the calculated and logged facsimile receipt times and that in some instances it would be desirable to provide for a programatically set and adjustable window of tolerance or allowable difference between such times which will nevertheless be treated as a valid indicator that an actual time of transmission was located.

Figure 4:
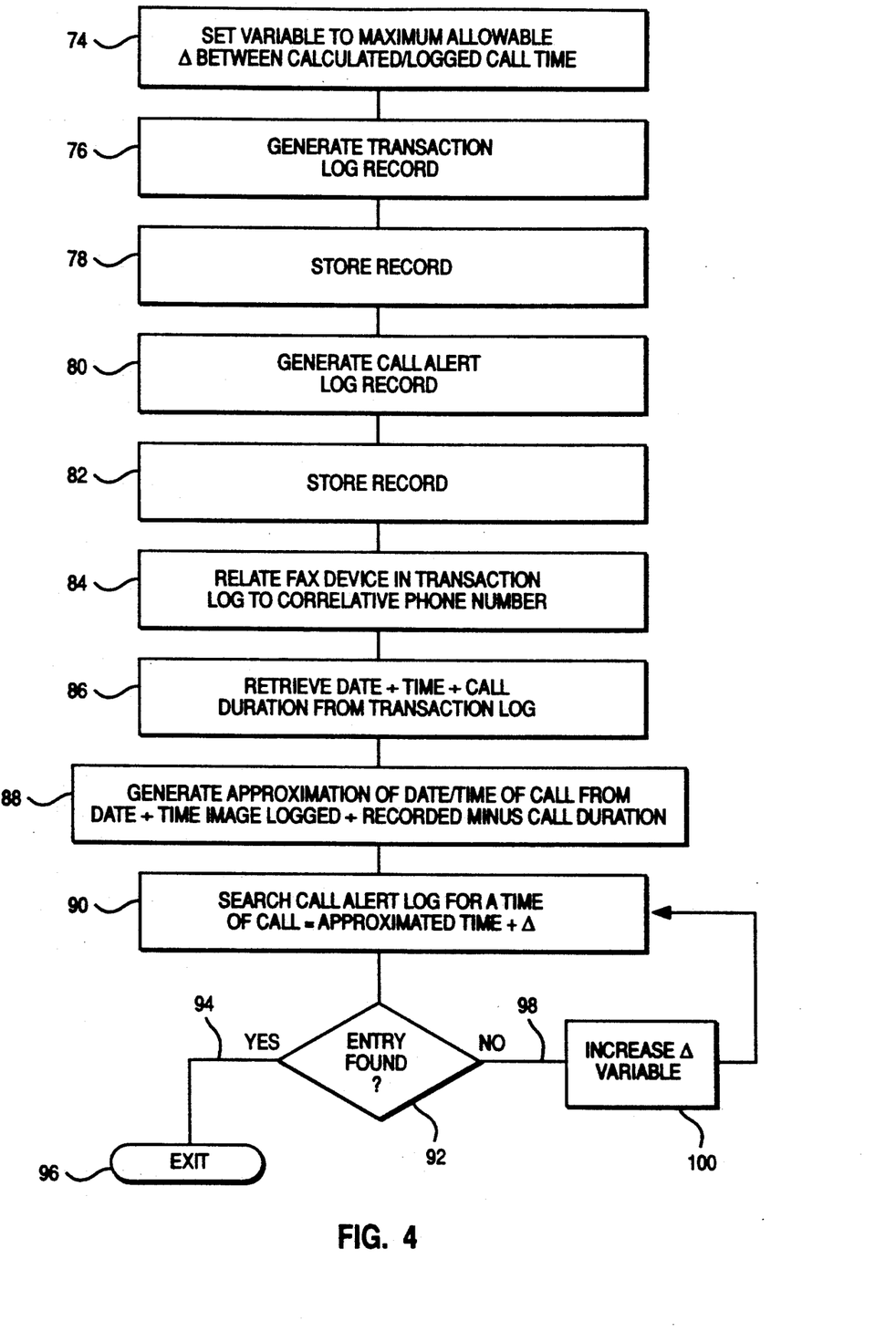
FIG. 4 is a flow diagram indicating the sequence of steps employed by the system of FIGS. 2 and 3 in order to detect the phone number of the originating facsimile transmission.

Accordingly, referring now to FIG. 4, a flow diagram of a routine is depicted therein for detecting a time of call which provides for a margin or window of discrepancy which may be adjustable. First at step 74 a variable is set corresponding to the usual expected allowable initial difference anticipated between the indication of the time of transmission in the call alert log 56 and the approximated transmission receipt time derived from the data in the transaction log 26 by subtracting the call duration from the hang-up time. At step 76, with respect to a facsimile transmission, a transaction log is generated which, as previously noted, will include the transmission duration and time of termination. At step 78, this data is stored by the system 102. A corresponding call alert log record is also generated, as indicated at step 80, recording the time the fax transmission was received, this data also being stored as indicated at step 82. At step 86 the time of termination of the call and call duration are retrieved from the transaction log record, whereupon an approximation of the time of the call is determined at step 88 by subtracting the call duration from the time of termination.

At step 90, a search routing is then executed of the call alert log 56 searching for a corresponding time of origination of the fax transmission call calculated at step 88 plus the differential set by the variable at step 74. At step 92, the process determines whether an entry is found within the preset margin. As an optional feature of the system 102, if such an originating fax transmission call-up within the prescribed margin is not detected as indicated by exit branch 98, this variable set at step 74 may be readjusted to a larger amount, as shown at step 100 whereupon the call alert log may be searched again at step 90. When an originating facsimile call time within the prescribed limit is found, as indicated by exit branch 94, a lookup routine may be executed of an appropriate fax index lookup table 62, as discussed with reference to FIG. 2, to associate the desired time of call with the customer number and/or any other desirable information associated with the phone number of the originating call whereupon the routine of FIG. 4 is exited at step 96.

We claim:

1. For use in an image management system, a method for correlating images and transmission sources of said images comprising
    receiving a transmission of telephony data including an image component;
    recording the source and time of said received transmission;
    storing said image component;
    recording the time of storing of said image component; and
    correlating said time of storing of said image component with said time of said received transmission, thereby correlating said image component with said source.

2. The method of claim 1 further including
    recording the duration of said transmission; and
    estimating said time of said received transmission as a function of said time of storing of said image component and said duration of said transmission.

3. The method of claim 2 further including
    establishing an expected difference between said time of said received transmission and said estimated time of said received transmission having a preselected magnitude; and
    wherein said correlating said image component and said source is as a function of said difference.

4. The method of claim 3 further including
    storing image management data prior to said transmission of telephony data functionally related to said image component:
    detecting from said transmission of telephony data a characteristic of said image data;
    retrieving a portion of said image management data as a function of said detected characteristic; and
    processing said image component as a function of said retrieved portion of said image management data.

5. The method of claim 4 wherein said characteristic of said image data is selected from a group comprising the magnitude of said image component and said time of said received transmission.

6. The method of claim 5 wherein said step of processing said image component comprises
    routing said image component as a function of said magnitude.

7. The method of claim 6 wherein said step of processing said image component comprises
    routing aid image component as a function of said time of transmission.

8. The method of claim 3 wherein said correlating is only when the difference between said time of said received transmission and said estimated time of said received transmission are within said preselected magnitude.

9. The method of claim 8 wherein said preselected magnitude is a function of delay in said system between said receiving of said transmission and said storing of said image component.

10. The method of claim 9 further including detecting absence of such correlation and wherein when said absence is detected, said expected difference is increased by a preselected increment; and
    wherein said correlating between said image component and said source is as a function of the sum of said expected difference and said preselected increment.

11. A computerized system for managing images comprising
    receiving means for receiving a telephony transmission including an image component;
    recording means interconnected to said receiving means for recording time, duration, and an indication of source of said telephony transmission;
    storing means interconnected to said receiving means for storing said image component and the time of storing of said image component;
    estimating means interconnected to said recording means and said storing means for determining an estimated time of said telephony transmission from said time of storing of said image component; and
    means interconnected to said estimating and said storing means for correlating said indication of source of said telephony transmission with said image component as a function of said estimated time.

12. A system for correlating images and transmission sources of said images comprising
    means for receiving a transmission of telephony data including an image component;
    means for recording the source and time of said transmission;
    means for storing said image component and the time of said storing of said image component; and
    means for correlating said image component with said source from said recorded time of transmission and said time of storing said image component.

13. The system of claim 12 further including
    means for recording the duration of said transmission; and
    means for estimating said time of transmission as a function of said time of storing of said image component and said duration of said transmission.

14. The system of claim 13 further including
    means for establishing an expected difference between said time of transmission and said estimated time of transmission having a preselected magnitude; and
    wherein said correlating said image component and said source is as a function of said expected difference.

15. The system of claim 14 further including
    means for storing image management data prior to said transmission of telephony data functionally related to said image component;
    means for detecting from said transmission of telephony data a characteristic of said image data;
    means for retrieving a portion of said image management data as a function of said detected characteristic; and
    means for processing said image component as a function of said retrieved portion of said image management data.

16. The system of claim 15 wherein said characteristic of said image data is selected from a group comprising the magnitude of said image component and said time of transmission.

17. The system of claim 15 further including
means for routing said image component as a function of said preselected magnitude.

18. The system of claim 16 further including
means for routing said image component as a function of said time of transmission.

19. The system of claim 14 wherein said correlating is only when the difference between said time of transmission and said estimated time of transmission are within said preselected magnitude.

20. The system of claim 19 wherein said preselected magnitude is a function of delay in said system between said transmission and said storing of said image component.

21. The system of claim 20 wherein when said correlating is detected, said expected difference is increased by a preselected increment; and
wherein said correlating between said image component and said source is then determined as a function of the sum of said expected difference and said preselected increment.

22. A computer program for use in an image management system to correlate the source of a telephony transmission which includes an image component with said image component comprising telephony server code means for generating a call log having, for each of a plurality of said telephony transmissions,
a telephony transmission receipt time, and
a corresponding source of said telephony transmission;
fax server code means for
storing said image component and a time of said storing of said image component, and
determining an estimate for said receipt time from said time of storing of said image component; and
indexing code means for correlating said image component and said source from said estimate of said receipt time.

23. The program of claim 22 wherein said image component of said telephony transmission is a facsimile transmission.

24. The program code of claim 23, wherein said fax server code means includes code means for
searching said call log to detect a match between one of a plurality of said telephony transmission receipt times and a corresponding said estimate for one of said receipt times within a preselected differential;
increasing said preselected differential upon failing to detect said match;
re-searching said call log to detect said match within said increased preselected differential; and
repeating the previous two steps until said match is detected.

* * * * *